(12) United States Patent
Shapiro et al.

(10) Patent No.: US 8,643,875 B2
(45) Date of Patent: Feb. 4, 2014

(54) RECEIPT HANDLING SYSTEMS, PRINT DRIVERS AND METHODS THEREOF

(75) Inventors: Jason Louis Shapiro, Dunwoody, GA (US); Jose Angel Jimenez, Alpharetta, GA (US); James Christopher Wilson, Cumming, GA (US)

(73) Assignee: Transaction Tree, Inc., Atlanta, GA (US)

( * ) Notice: Subject to any disclaimer, the term of this patent is extended or adjusted under 35 U.S.C. 154(b) by 1064 days.

(21) Appl. No.: 12/654,937

(22) Filed: Jan. 8, 2010

(65) Prior Publication Data
US 2010/0177343 A1 Jul. 15, 2010

Related U.S. Application Data

(60) Provisional application No. 61/193,936, filed on Jan. 9, 2009.

(51) Int. Cl.
*G06F 15/00* (2006.01)
(52) U.S. Cl.
USPC ........... 358/1.15; 705/14.25; 705/10; 705/21; 358/1.1; 358/1.9
(58) Field of Classification Search
USPC ...................... 358/1.15, 1.1; 705/21, 24, 206
See application file for complete search history.

(56) References Cited

U.S. PATENT DOCUMENTS

| | | | |
|---|---|---|---|
| 2002/0002519 A1 | 1/2002 | Kosuda et al. | |
| 2003/0142855 A1* | 7/2003 | Kuo et al. | 382/119 |
| 2003/0217329 A1 | 11/2003 | Good | |
| 2004/0078282 A1* | 4/2004 | Robinson | 705/26 |
| 2006/0261149 A1 | 11/2006 | Raghavendra | |
| 2007/0045405 A1* | 3/2007 | Rothschild | 235/380 |
| 2007/0069013 A1* | 3/2007 | Seifert et al. | 235/383 |
| 2008/0098073 A1* | 4/2008 | Coleman et al. | 709/206 |

* cited by examiner

*Primary Examiner* — King Poon
*Assistant Examiner* — Iriana Cruz
(74) *Attorney, Agent, or Firm* — Smith Risley Tempel Santos LLC; Gregory Scott Smith

(57) ABSTRACT

A method of processing receipts, including: obtaining transaction data including a plurality of categories of information necessary to describe a purchasing transaction of a customer at a store location; obtaining image data representing a receipt corresponding to the purchasing transaction of the customer at the store location; obtaining an e-mail address of the customer; providing an option to print the receipt at the store location and an option to e-mail the receipt to the customer; obtaining a selection of at least one of the provided options; if the option to print is selected, initiating printing of the image at the store location; and if the option to e-mail is selected, sending an e-mail to the e-mail address of the customer, the e-mail including providing at least one of the image data and the transaction data.

13 Claims, 12 Drawing Sheets

Process Flow

```xml
<?xml version="1.0"?>
<Receipt xmlns:xsi="http://www.w3.org/2000/10/XMLSchema-instance" Currency="USD"
xsi:noNamespaceSchemaLocation="DR_V2_Top.xsd">
<Location>
<PartyID IDType="StoreID">0</PartyID>
<OrganizationName>Tailspin Toys</OrganizationName>
<Address>
<Street1>2934 N. Main Street</Street1>
<City>Woodinville</City>
<State>WA</State>
<PostalCode>83743</PostalCode>
</Address>
<Telephone TelephoneType="Business">(425) 555-0103</Telephone>
<Email>someone@example.com</Email>
</Location>
<Device DeviceType="POS">
<DeviceID>1</DeviceID>
<TransactionNumber>18</TransactionNumber>
</Device>
<TransactionID>0</TransactionID>
<DateTime>2009-11-20T17:28:10</DateTime>
<TotalAmount>9.99</TotalAmount>
<TransactionDetail xsi:type="RetailTransaction">
<Operator>
<AssociateID>1</AssociateID>
<Name>
<First>Alex</First>
<Last>Nayberg</Last>
</Name>
</Operator>
<Total TotalType="Subtotal">
<Text>Subtotal</Text>
<Amount>9.99</Amount>
</Total>
<Total TotalType="Total">
<Text>Total</Text>
<Amount>9.99</Amount>
<ItemCount>1</ItemCount>
</Total>
<SaleItem>
<Text>Soccer ball</Text>
<POSItemID>49</POSItemID>
<ItemAlternateID>15120</ItemAlternateID>
<Quantity>1</Quantity>
<UnitPrice>9.99</UnitPrice>
<ActualUnitPrice>9.99</ActualUnitPrice>
<ExtendedPrice>9.99</ExtendedPrice>
<RegularPrice>9.99</RegularPrice>
<DepartmentID>4</DepartmentID>
<Tax TaxExempt="true"/>
</SaleItem>
</TransactionDetail>
<TransactionTreeData><MerchantNumber>999999</MerchantNumber><StoreNumber>000001
</StoreNumber><RegisterNumber>000001</
RegisterNumber><Vendor>Transaction
Tree</Vendor><EntryType>email</EntryType><EntryData>cwilson@msiweb.com</
EntryData><ImageFileName>112309105628.jpg</ImageFileName></TransactionTreeData></Receipt>
```

FIG. 10

RECEIPT HANDLING SYSTEMS, PRINT DRIVERS AND METHODS THEREOF

This application claims the full benefit of the filing date of U.S. Provisional Patent Application 61/193,936, filed on Jan. 9, 2009, which is incorporated by reference for all purposes in its entirety as if fully set forth herein.

BACKGROUND

1. Field of the Invention

The present invention relates to receipt handling systems, print drivers and methods thereof.

2. Discussion of the Related Art

In a conventional case of purchasing at a store location, when a customer makes a purchase, a receipt is printed and handed to the customer after the purchasing transaction is complete. Often, customers may quickly throw away the receipts, creating unnecessary waste. Or, customers may misplace their receipts. Later, when the receipt is required, such as for a return, the customer can't find the receipt when it is needed.

In the conventional case of purchasing online, when a customer makes a purchase, a receipt may be e-mailed to the customer and/or the customer may print a receipt on the printer associated with the customer's computer.

In the related art, when a customer makes a purchase at a store location, a receipt is e-mailed to an e-mail address of the customer.

There is a need for improved systems that avoids the waste associated with unwanted receipts, that e-mails a receipt to a customer, that allows a customer to obtain a printed receipt at the store location and that enables marketing capabilities associated with e-mailed receipts and any associated analytics.

SUMMARY

Accordingly, the present invention is directed to receipt handling systems, print drivers and methods thereof that substantially obviate one or more of the problems due to limitations and disadvantages of the related art.

An advantage of the present invention is to provide receipt handling systems, print drivers and methods capable of reducing production of waste paper.

Another advantage of the present invention is to provide receipt handling systems, print drivers and methods capable of e-mailing a receipt to a customer.

Yet another advantage of the present invention is to provide receipt handling systems, print drivers and methods that allow a customer to obtain a printed receipt at the store location.

Yet another advantage of the present invention is to provide receipt handling systems, print drivers and methods that enable marketing capabilities associated with e-mailed receipts and any associated analytics.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a method of processing receipts includes: obtaining transaction data from a point-of-sale (POS) computer system at a store location, the transaction data including a plurality of categories of information necessary to describe a purchasing transaction of a customer at the store location; obtaining image data from the POS system at a store location, the image data representing a receipt corresponding to the purchasing transaction of the customer at the store location; obtaining an e-mail address of the customer from a customer information database associated with the POS system; providing, to a display device at the store location, an option to print the receipt at the store location and an option to e-mail the receipt to the customer; obtaining a selection of at least one of the provided options; if the option to print is selected, initiating printing of the image data at the store location; and if the option to e-mail is selected, e-mailing the receipt to the customer, including: providing the e-mail address obtained from the customer information database to a display device at the store location; obtaining customer confirmation whether the e-mail address is correct; if the e-mail address is not correct, obtaining a corrected e-mail address of the customer; transmitting the image data and the transaction data to a server in communication with one or more POS systems at one or more store locations, including generating a data file, the data file including the transaction data, the correct e-mail address of the customer and a file name corresponding to the image data; assigning an e-mail template based on the data file transmitted to the server; and sending an e-mail to the correct customer e-mail address, wherein the content of the email is based on the assigned e-mail template, where the e-mail provides the image data obtained by the server.

In another aspect of the present invention, a method of processing receipts includes: obtaining transaction data including a plurality of categories of information necessary to describe a purchasing transaction of a customer at a store location; obtaining image data representing a receipt corresponding to the purchasing transaction of the customer at the store location; obtaining an e-mail address of the customer; providing an option to print the receipt at the store location and an option to e-mail the receipt to the customer; obtaining a selection of at least one of the provided options; if the option to print is selected, initiating printing of the image at the store location; and if the option to e-mail is selected, sending an e-mail to the e-mail address of the customer, the e-mail including providing at least one of the image data and the transaction data.

In another aspect of the present invention, a computer-readable medium having computer readable instructions stored thereon for execution by a processor to perform a method includes: obtaining transaction data including a plurality of categories of information necessary to describe a purchasing transaction of a customer at a store location; obtaining image data representing a receipt corresponding to the purchasing transaction of the customer at the store location; obtaining an e-mail address of the customer; providing an option to print the receipt at the store location and an option to e-mail the receipt to the customer; obtaining a selection of at least one of the provided options; if the option to print is selected, initiating printing of the image at the store location; and if the option to e-mail is selected, sending an e-mail to the e-mail address of the customer, the e-mail including providing at least one of the image data and the transaction data.

In another aspect of the present invention, a system for processing receipts, includes: an application on a point-of-sale (POS) computer system, the application receiving transaction data including a plurality of categories of information necessary to describe a purchasing transaction of a customer at a store location; obtaining image data representing a receipt corresponding to the purchasing transaction of the customer at the store location; obtaining an e-mail address of the customer; providing an option to print the receipt at the store location and an option to e-mail the receipt to the customer; obtaining a selection of at least one of the provided options; if the option to print is selected, initiating printing of the image at the store location; and if the option to e-mail is selected, transmitting the image data and the transaction data; and one or more servers receiving the transmitted image data and transaction data and sending an e-mail to the e-mail address of the customer, the e-mail including providing at least one of the image data and the transaction data.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 10 is an exemplary embodiment of a data file, such as an XML file.

DETAILED DESCRIPTION OF THE ILLUSTRATED EMBODIMENTS

Reference will now be made in detail to embodiments of the present invention, examples of which are illustrated in the accompanying drawings.

In the retail trade, "point of sale" (POS) is generally the moment when a customer walks up to a counter with goods and prepares to purchase them. A POS system handles the transaction. A basic POS system may include an electronic cash register, where the clerk can ring up goods in the cash register and produce a paper receipt for the customer. A more complex POS system may have inventory management capabilities, credit card verification, a customer data center, and retail data center. The hardware of a POS system may include a display screen for the clerk, a customer display, a cash drawer, a credit card swiping system, a printer, bar code scanner, computer, or laptop. A POS system may also include a self checkout kiosk. A POS system may also include a plurality of POS subsystems. The POS subsystems may handle purchasing transactions for a plurality of customers. The POS system may further include a central data system in communication with the plurality of POS subsystems. The central data system may store the processing information of the purchasing transactions at the plurality of POS subsystems.

At some stores, a customer information database includes contact information, sales history and other various forms of information. The customer information database may be associated with a customer's name, mailing address, e-mail address, credit card number, membership number, or some other unique identifier. This customer information database may be a subsystem of the POS system.

Figure 1:
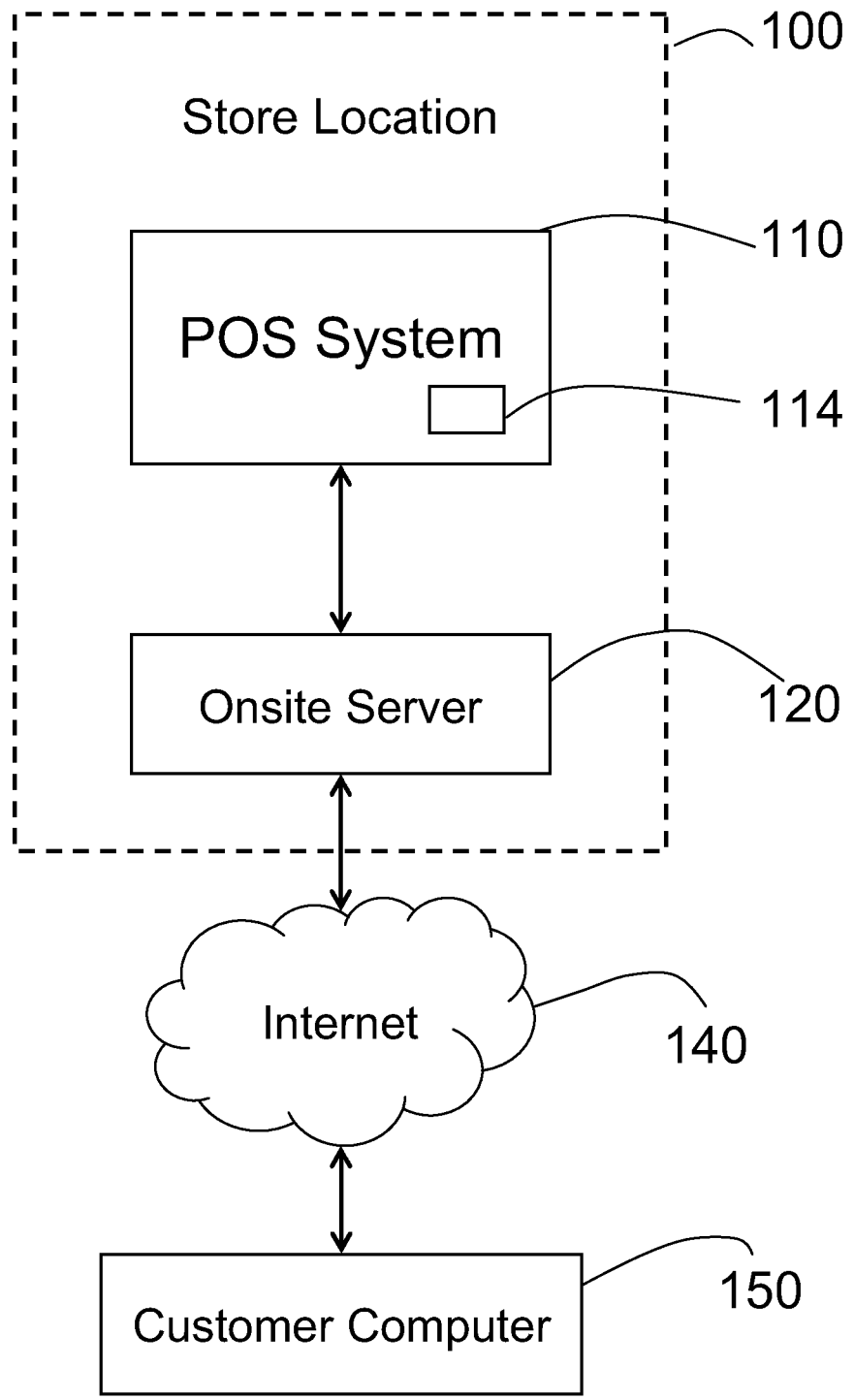
FIG. 1 is a diagram representing a receipt handling system according to a first illustrated embodiment of the present invention.
Figure 2:
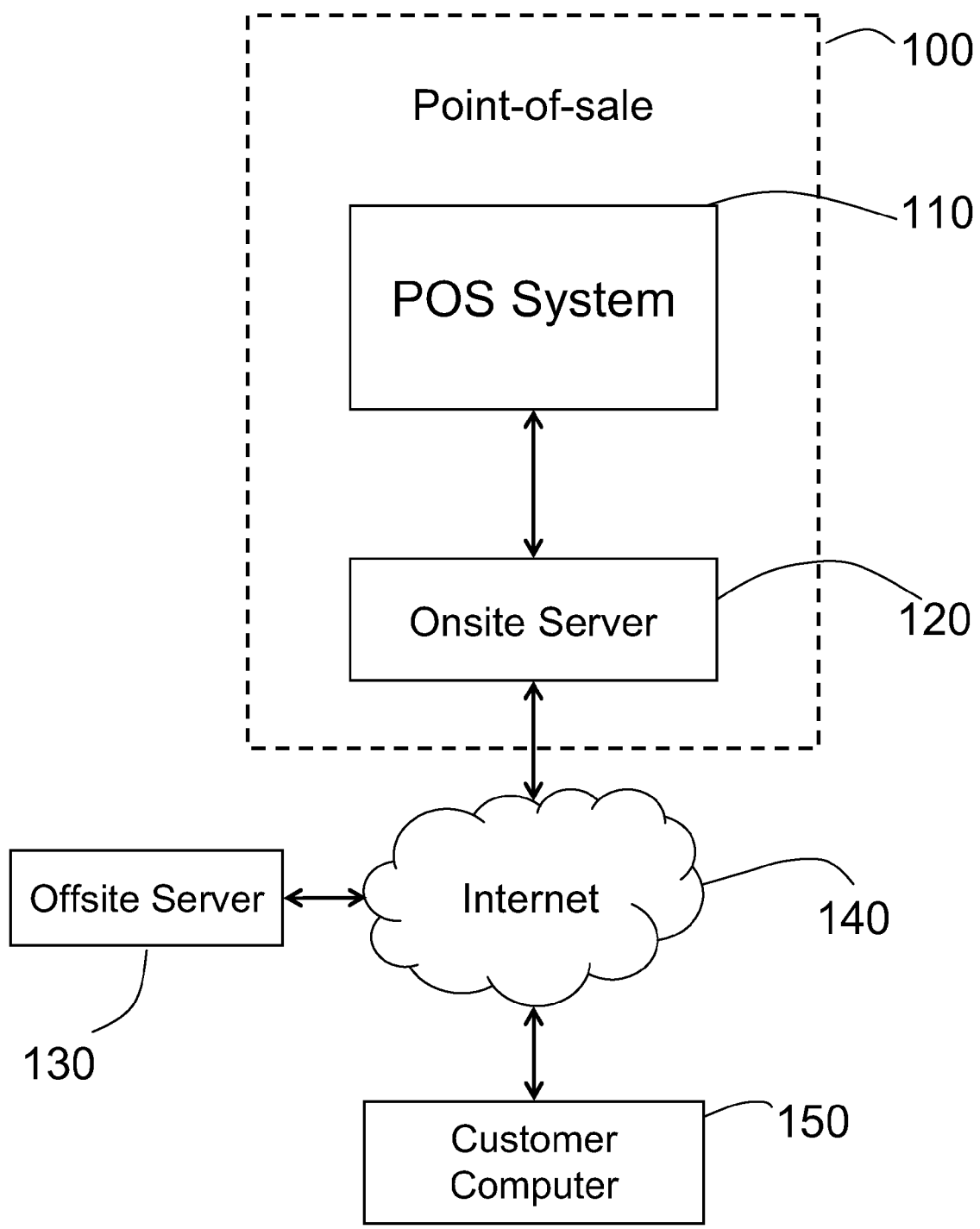
FIG. 2 is a diagram representing a receipt handling system according to a second illustrated embodiment of the present invention.
Figure 3:
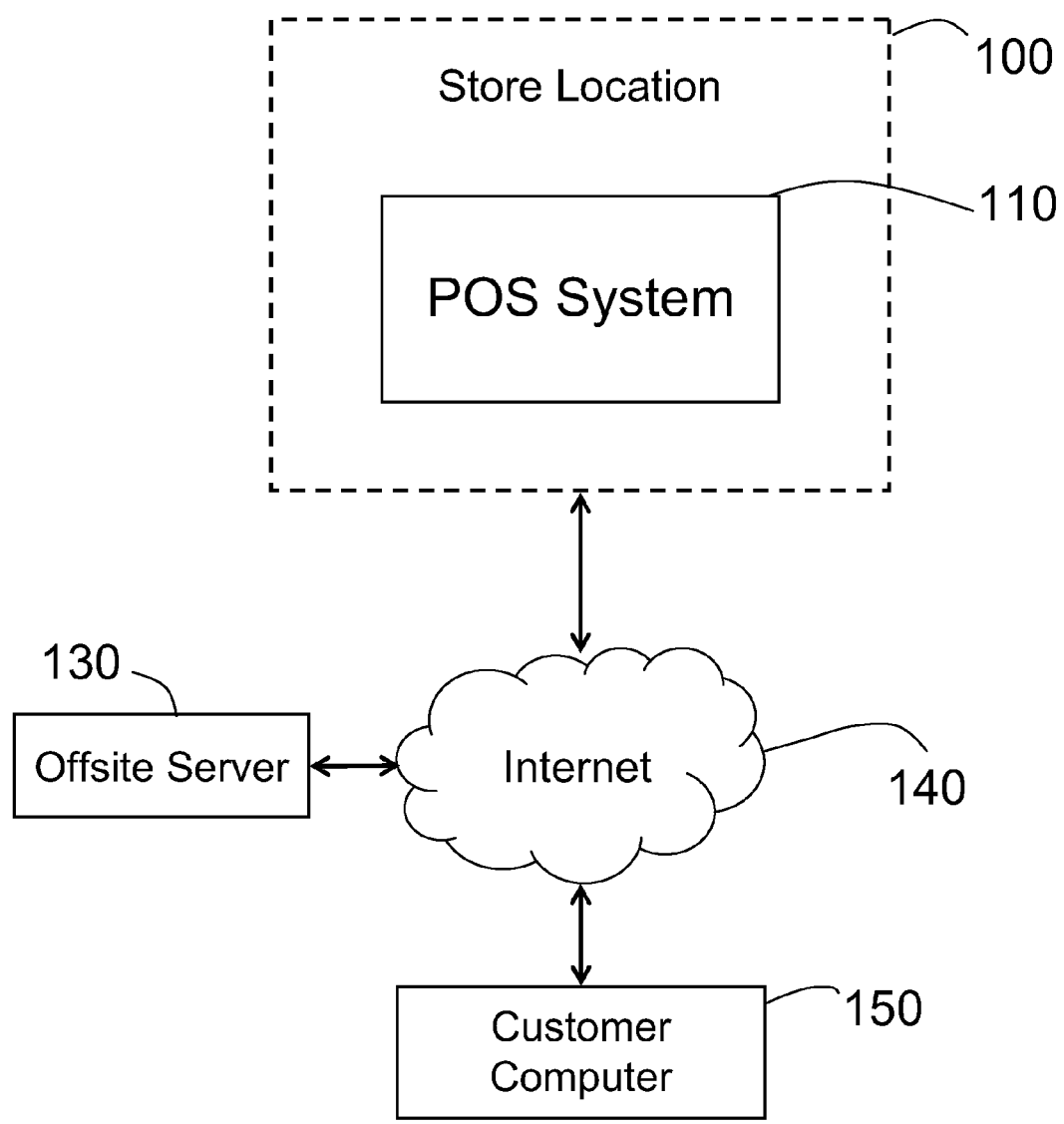
FIG. 3 is a diagram representing receipt handling system according to a third illustrated embodiment of the present invention.

FIGS. 1-3 illustrate embodiments of the present invention relating to receipt handling systems. The receipt handling systems engage with various existing POS systems, including customer information databases to provide for e-mailing of electronic receipts to customers.

As shown in FIGS. 1-3, at a store location 100, a point of sale (POS) computer system 110 handles a purchasing transaction of a customer. The POS system 110 may include or be connected to a customer information database. The POS system may directly connect to the internet 140 or be connected to internet 140 via one or more servers. After items to be purchased are scanned, or otherwise entered, into the POS system 110, an image of a receipt corresponding the purchased goods or services is captured.

Before or after the image is captured, a display screen may appear at a display at the store location, such as a display device for a cashier, a display device for a customer, a keypad, a touch screen, a mobile device, or another device for displaying images. The display screen and an associated input device allow a user to select how the receipt will be received.

If print is selected, the image may be sent to a printer associated with the POS system at the store location, after which the customer may receive the printed receipt while at the store location. If e-mail is selected, an e-mail address may be obtained from a customer information database associated with the POS system or the e-mail address may be inputted by the customer or cashier during or after the purchasing transaction. The customer e-mail address is then associated with the image. The image and associated customer e-mail address may then be sent across an onsite network to the onsite server 120. Alternatively, other information identifying the customer may be associated with the image, such as a customer PIN, from which a customer e-mail address may be subsequently determined.

Additionally, if email is selected, then transaction data may be obtained from the POS system and/or the customer information database to create a data file. The data file may also be, for example, an XML file. The data file may include the customer's e-mail address, the image file name, and any transaction information obtained from the POS system or customer information database. The data file and image or image file may then be sent across an onsite network to the onsite server 120. The data file may then be used to create an e-mail template that is e-mailed to the customer along with the image file containing the image of the receipt. The data file and image file may also or alternatively be sent to a repository, which may be latter retrieved by the customer. For example, the e-mail to the customer may include a link to an image file stored in the repository.

FIG. 1 illustrates a first embodiment of the receipt handling system including an onsite server. At a store location 100, the point-of-sale (POS) computer system 110 connects an onsite server 120. The onsite server 120 connects to internet 140, which connects to a customer computer 150. After items are scanned by the POS system, an image of a receipt corresponding to the purchasing transaction may be captured. For example, a print driver may be installed to the POS system 110 to obtain the image by capturing the image or receiving a document corresponding to the purchasing transaction and then converting the document to an image. Additionally, after the items have been scanned by the POS system 110, a data file may be created. For example, the print driver may obtain transaction data from the POS and/or the customer information database. This data may be converted to XML format to create an XML file.

If print is selected, the image or document may be sent from the first driver to a second print driver configured to the type of printer that is desired.

The POS computer system 110 may include at least one receipt processing software application 114, such as the print driver. The POS system 110 and the one or more servers 120 may run Windows, Linux, or Mac OS as an operating system. The print driver may be installed on the POS computer system 110 via a network connection, USB, CD, or disk format. Upon installation, the print driver may be set as the default print driver or the user may select the print driver.

The onsite server 120 may run a version of e-mail server software. This may include IBM Lotus Domino, Microsoft Exchange, or an open source e-mail server. The Offsite server 130 may also run any version of database management software as well.

The onsite server 120 may receive the receipt image and data file via a network connection to the POS and attach the image file and e-mail template, created from analyzing the data file, to an e-mail. The onsite server 120 may create the e-mail template by analyzing the information located in the data file, or xml file, and attach any additional marketing data and/or marketing links to the e-mail template. The marketing information may be customized based on the content of the data file. For example, the email template or marketing information may be determined based on the name of the store, based on the location of the store, based on the location of the customer, based on the date or time of the transaction, based on the item purchased or price of the item or transaction. The e-mail template may then be attached to the e-mail. The onsite server 120 may take the customer e-mail address placed in a data file such as the xml file and e-mail the receipt image file, and e-mail template to the customer e-mail address. This e-mail may be sent across the internet 140.

FIG. 2 represents a second exemplary embodiment including an onsite server and an offsite server.

The onsite server 120 (as shown in FIG. 1) may receive files such as a receipt image file and an xml file, from, for example, a print driver installed on the POS system 110, via the network and then the onsite server 120 may send them across the internet 140 to an offsite server 130.

The offsite server 130 may then take the files received from the onsite server 120 via the internet 140, analyze the files and compose an e-mail to the customer e-mail address. In particular, the server 130 may create an e-mail template, based on transaction data included in the xml file for the purpose of sending customized marketing data, to the customer e-mail address. The offsite server 130 may also pull the e-mail address from the xml file and e-mail the receipt image and e-mail template to the customer e-mail address. The e-mail may be sent across the internet 140 to reach the customer computer 150.

The offsite server 130 may run a version of e-mail server software. This includes IBM Lotus Domino, Microsoft Exchange, or open source e-mail server. The Offsite server 130 may also run any version of database management software as well.

FIG. 3 illustrates a third embodiment of a receipt handling system of the present invention, including an offsite server.

This embodiment may include one or more server(s) 130 hosted offsite, such as by a third party. The offsite server 130 is not in the same location as POS computer system 110 where the print driver may be installed. The server 130 may be running Windows, Linux, or Mac OS for the operating system.

The offsite server 130 may run a version of e-mail server software. This may include IBM Lotus Domino, Microsoft Exchange, or an open source e-mail server. The server 130 may also run any version of database management software as well. The offsite server 130 is connected to internet 140 and may send or receive the files to and from the POS systems 110 and the Customer Computer 150 via the internet 140.

The offsite server 130 may then receive the receipt image and data file, such as xml file, from the POS system 110 via the internet 140 and attach the image files and e-mail template, created from analyzing the data file, to an e-mail. The server 130 may create create the e-mail template by analyzing the information located in the data file, or xml file, and attach any additional marketing data and/or marketing links to the e-mail template. The marketing information may be customized based on the content of the data file. For example, the email template or marketing information may be determined based on the name of the store, based on the location of the store, based on the location of the customer, based on the date or time of the transaction, based on the item purchased or price of the item or transaction. The e-mail template may then be attached to the e-mail. The offsite server 130 may also take the customer e-mail address placed in a data file such as the xml file and e-mail the receipt image file, and e-mail template to the customer e-mail address. This e-mail may be sent across the interne 140 to reach its destination.

Therefore, a system and method is disclosed for consumers to select how to receive their receipts. The consumer may choose to receive a receipt by e-mail, in a printed paper format, or both. For example, after completing the check out process at a brick and mortar store location, the consumer may be prompted, for example, by a POS system screen to select how they would like to receive their receipt. This consumer may be prompted by a display screen, signature capture device, website, or by the cashier asking the consumer. For e-mailing the receipt the software may capture an image of the receipt, and create a data file. The receipt image may then be e-mailed to the consumer or to a repository on the web that may be accessed by the customer. The e-mail may also contain coupons, ads, surveys, and any other marketing information. The marketing information may be customized based on the analysis of the received transaction data associated with the receipt image.

Additionally, customers may pre-register their preferred option to print or email or both through different mediums. These mediums include a receipt repository website, retailer website, kiosk, POS, or self check out. As such, customers may select an option that is always used at the time of the transaction. For example, if a user selects to always e-mail, then the customer's receipt will always be e-mailed to the user.

POS, self check out, or kiosks can be configured in a variety of ways. The software enables these systems to provide and generate types of receipt outputs.

For example, the system allows retailers, businesses, and users who use computer systems, such as POS systems and self check out kiosk systems the ability to e-mail documents or images, such as receipts relating to purchasing customers. Purchases can be via cash, credit cards or other forms of payments accepted at the POS level.

In one aspect, a print driver may be installed on the operating system of a POS computer system. The operating systems may be, for example, Windows, Linux, or Mac OS. or any other computer system.

When a user, customer, or an application on the POS requests to print a document or image, such as upon completion of the customer's purchase, the print driver may be engaged, interrupting the normal print process. A screen may then appear allowing for, for example, the user or customer to choose between printing and e-mailing the image or document.

If the user or customer selects to print, the print driver captures the image or document and prints to a designated printer, such as the default printer of the POS. Alternatively, this first print driver may engage a second print driver customized to the designated printer.

If the user or customer chooses the e-mail option, the print driver captures the image of the receipt, transaction data associated with the customer's purchasing transaction, and customer identification information. The print driver may search the customer identification information for an email address, and confirm the accuracy of the email address by querying the customers. Additionally, or alternatively, the print driver may ask the customer for the e-mail address by displaying a query to the customer. In yet another aspect, the print driver may ask for a PIN or other number or other identifying information such as for existing users. The customers identifying information, such as an address e-mail may be associated with the image of the receipt, the transaction data associated with the transaction, the customer's identifying information, and/or the data file. In one embodiment, the transaction data and customer email address are placed in an XML file, which is then sent to an onsite or offsite server.

Alternatively, the print drive may capture the receipt image, the transaction data associated with the transaction, customer identifying information, and/or create a data file before the customer chooses the e-mail option or after the print driver asks for either the customer's e-mail or PIN information.

This information, the data file and image file, is then transmitted to the onsite or offsite server and eventually at least the receipt image is transmitted electronically to the customer e-mail address or web repository.

Three examples of how, the data may be transmitted are disclosed as follows:

(1) The receipt image and XML file is sent to an onsite server. This on site server is a computer that may be running Window, Linux, or Mac OS for the operating system. This server may be configured to generate an e-mail and attach the receipt image and customized marketing information based on the analysis of the content of the XML file or the e-mail template.

(2) The receipt image and XML file are sent to one or more offsite servers. The offsite servers may run for example, Windows, Linux, or Mac OS for the operating system. This off site server(s) is configured to generate an e-mail and attach the receipt image to the email, including the e-mail template and/or marketing information.

(3) The receipt image and XML file are captured at the POS terminal level. The POS terminal is the computer that the print driver is installed on. The POS terminal generates and e-mails the customer and attaches the receipt image, including the marketing information and/or e-mail template. The e-mail is then sent electronically to the e-mail address.

In yet another embodiment, an e-mail client may be installed on the POS system, such as Lotus Notes, Microsoft Outlook, or an open source e-mail client, which may then attach the image file and data files to an e-mail. The e-mail address in the XML file may be used and the e-mail may be sent across the interne 140.

According to another embodiment, instead of a print driver, another computer application may be installed on the POS system 110. Before or after completion of the customer's purchase, the computer application initiates interrupting the normal print process. The application may provide the customer with a screen option to receive a paper receipt or an e-mailed image of the receipt. The application may ask for either an e-mail address or a Personal Identification Number (PIN) information (PIN may be for existing users of the system). Once this information is provided, the application may relay the receipt image and an XML file(s) to a Spoke Server. Each image may have a companion XML file that may contain the e-mail address or PIN value. The companion XML file may further contain, for example: File Description, Time of transaction, Date of transaction, Merchant number, Store number, Register number, Entry type, Entry data, Image file name, and Transaction Id.

The Spoke Server may capture the information sent from the POS via the Application and optionally process the information to check whether the user is either an existing user or a new user. The Spoke Server may also send the image file and companion XML file to the Hub Server via a network connection. The spoke server being able to send to hub server.

The Hub Server may be connected to the Central Database and the interne 140. The Hub Server may send the e-mail with the receipt template and image file to the customer computer 150 and may also provide the receipt image, receipt template, and data file to a user web portal which may be fed by the repository.

In one aspect, the spoke server may house a user database used to validate the PINS and associate them to an appropriate customer email address. Also, the spoke server may contain a virtual print driver.

The spoke server may be an onsite or offsite server. The hub server may be an onsite or offsite server.

Figure 4:
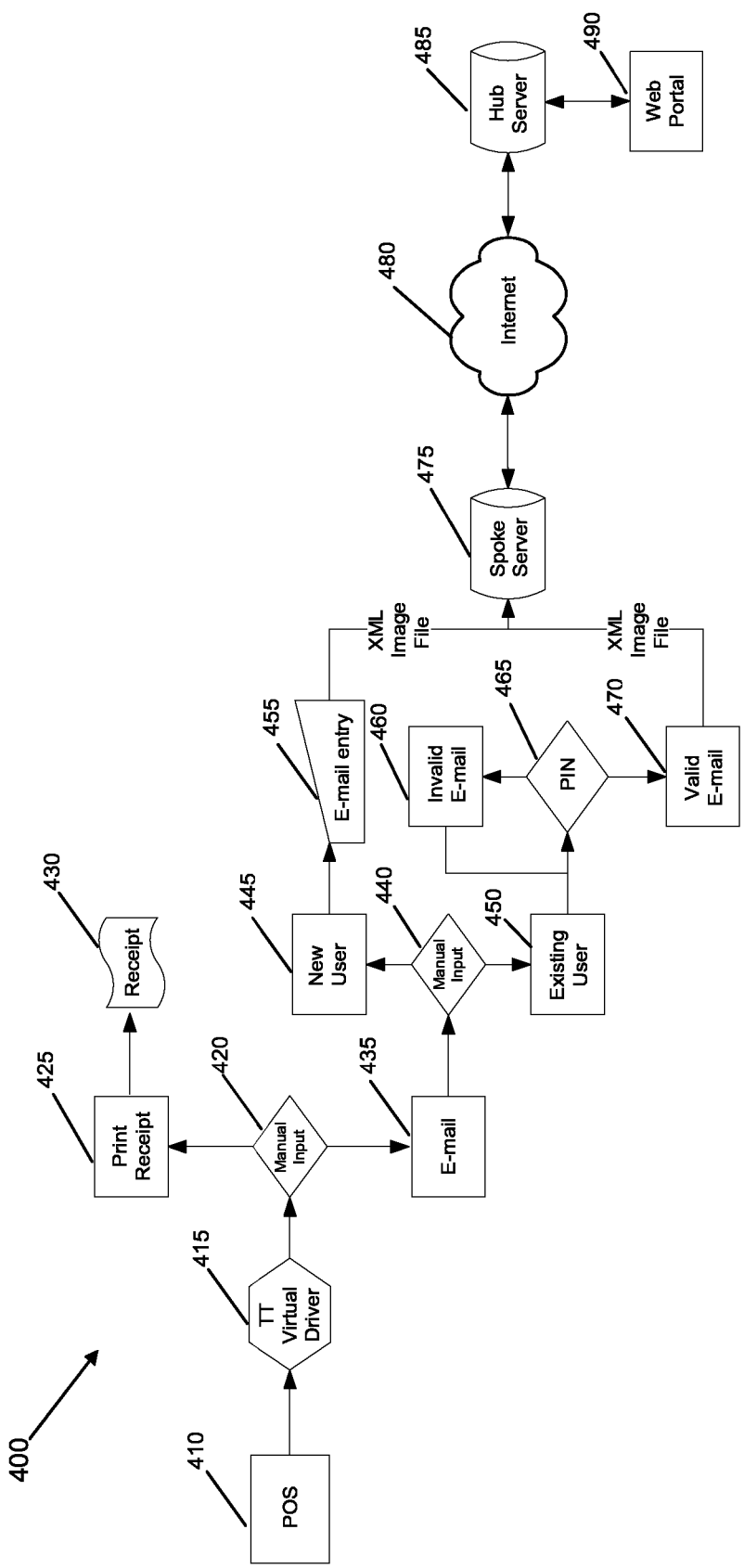
FIG. 4 is a receipt handling method according to a fourth embodiment of the present invention.

FIG. 4 is a diagram representing an exemplary embodiment pertaining to a process flow 400 of the present invention.

After the desired products have been scanned in, entered in, or recorded the Virtual Driver 415 of the POS 410 is engaged to provide the user with the option 420 to either print 425 the receipt or e-mail 435 the receipt. If the user, for example the cashier or customer, manually inputs 420 the option to print 425 the receipt a physical or conventional receipt 430 can be generated. If the user manually inputs 420 the option to e-mail 435 the user is provided with the option 440 to either identify themselves as a new user 445 or an existing user 450. If the user is a new user 445 then the user is prompted to enter in their e-mail address 455. If the user is an existing user 450 the user's e-mail may be checked with a PIN 465. If the user's e-mail is invalid then the XML file, and an associated image file, is not sent to the spoke server. The user may then be prompted to enter in a valid e-mail address 455. This e-mail will then be associated with the existing user (not illustrated) and the XML file, and associated image file. These files are then sent to the spoke server 475. If the user's e-mail is valid 470 then a XML file, and associated image file, are sent to the spoke server 475. Likewise, if the new user 445 enters in an e-mail address 455 then an XML image file, and associated image file, are sent to the spoke server 475 as well. In either event the XML file, and associated image file, are sent through the interne 480 to a hub server 485 and web portal 490.

Figure 5:
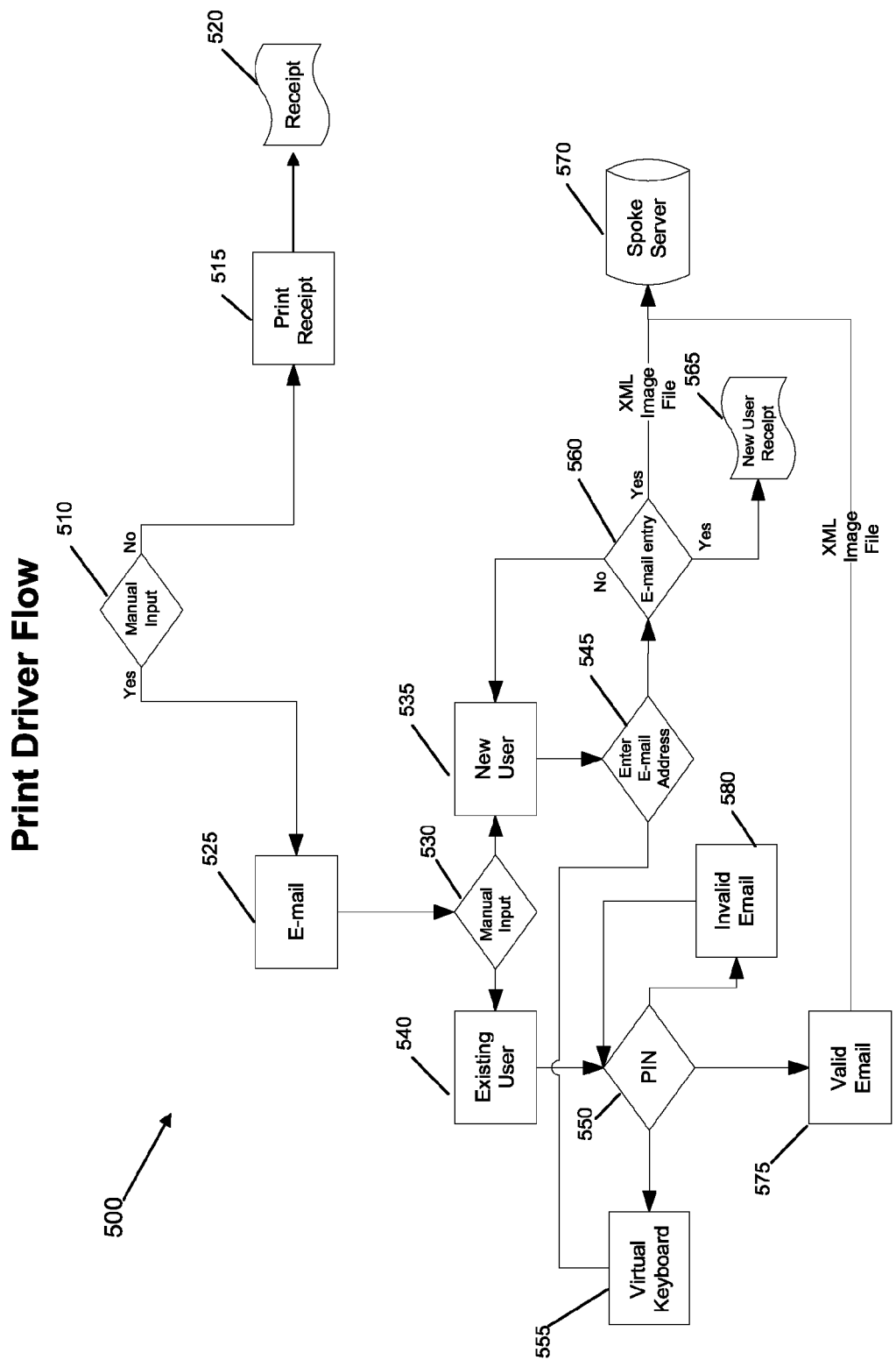
FIG. 5 is a receipt handling method according to a fifth embodiment of the present

FIG. 5 is a diagram representing a fourth exemplary embodiment pertaining to a print driver flow diagram 500 of the present invention.

After the desired products have been scanned in, entered in, or recorded the Virtual Driver (not illustrated in the FIG. 5) of the POS (not illustrated in FIG. 5) is engaged to provide the user with the option 510 to either print 515 the receipt or e-mail 525 the receipt. If the user, for example cashier or customer, manually inputs 510 the option to print 515 the receipt a physical receipt 520 is generated.

If the user manually inputs 510 the option to e-mail 525 the user is provided with the option 530 to either identify themselves as a new user 535 or an existing user 540. If the user is a new user 535 then the user is prompted to enter in or record an e-mail address 545. The user may enter in the e-mail address through a virtual keyboard, keyboard, or any known means in the art. If an e-mail address is entered 560 then a new user receipt 565 is generated and an XML file, containing the transaction data, is associated with the image file, and sent to a spoke server 570. If an e-mail address is not entered 560 then the user is again prompted to enter or record an e-mail address 545.

If the user identifies themselves as an existing user 540 then a PIN 550 is used to automatically determine if an email associated address with the PIN number is valid 575 or invalid 580. The PIN 550 may be referenced with (or checked against), for example, a customer database indicating whether or not the existing user's e-mail is valid 575 or invalid 580. Additionally or in the alternative, the PIN 550 may be used to present the user with the current e-mail address on record or in the database. The user may then indicate whether the e-mail address is valid 575 or invalid 580. In either event, if the PIN 550 is associated with an invalid e-mail address 580 then a virtual keyboard 555, keyboard, or any known means in the art may be used to enter in the e-mail address 545 of the user. If an e-mail address is entered 560 then a new user receipt 565 is generated and an XML file, and associated image file, is generated and may be sent to a spoke server 570. If an e-mail address is not entered 560 then the user is again prompted to enter or record an e-mail address 545. If the PIN 550 is associated with a valid e-mail address 575 then an XML image file, and associated image file, are generated and may be sent to a spoke server 570.

The XML file, and associated image file, may then be sent through the interne to a hub server and web portal. This feature is not illustrated in FIG. 5 as these features were illustrated in FIG. 4. Also, not illustrated in FIG. 5 is the option to perform both the printing 525 of a receipt 520 and e-mailing 515 of a receipt and XML file which is used to create an e-mail template. A similar process is followed as described above with regards to FIG. 5 the difference being the user may choose the option to both print 525 and e-mail 525.

Figure 6:
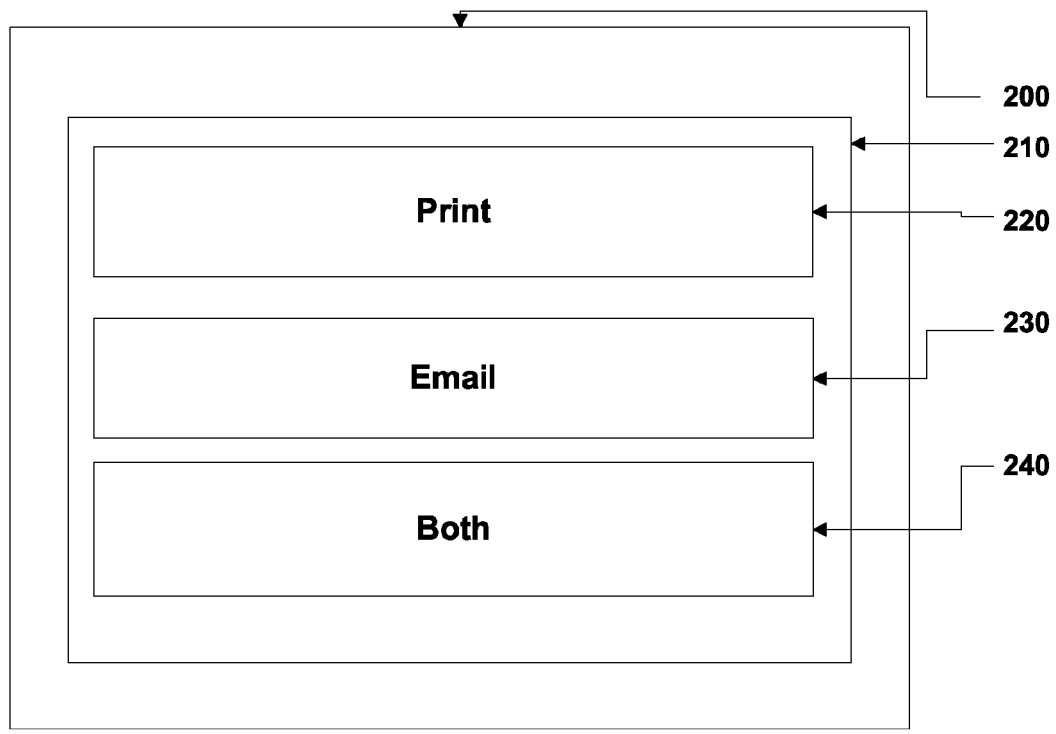
FIG. 6 is an exemplary embodiment of a display screen for users to select how a customer will receive a receipt.

FIG. 6 is an exemplary embodiment of a display screen for allowing users to select the desired format of the receipt output. The screen 200 may be located for example on or near the cashier's register, the POS, pole display, or any known device in the art used for displaying. The screen 200, for example, may include a background 210 for displaying selectable buttons. These buttons may include, for example, the options to Print 220, E-mail 230, or perform Both 240. Choosing Both 240 will allow the user to both Print 220 and E-mail 240 the receipt.

Figure 7:
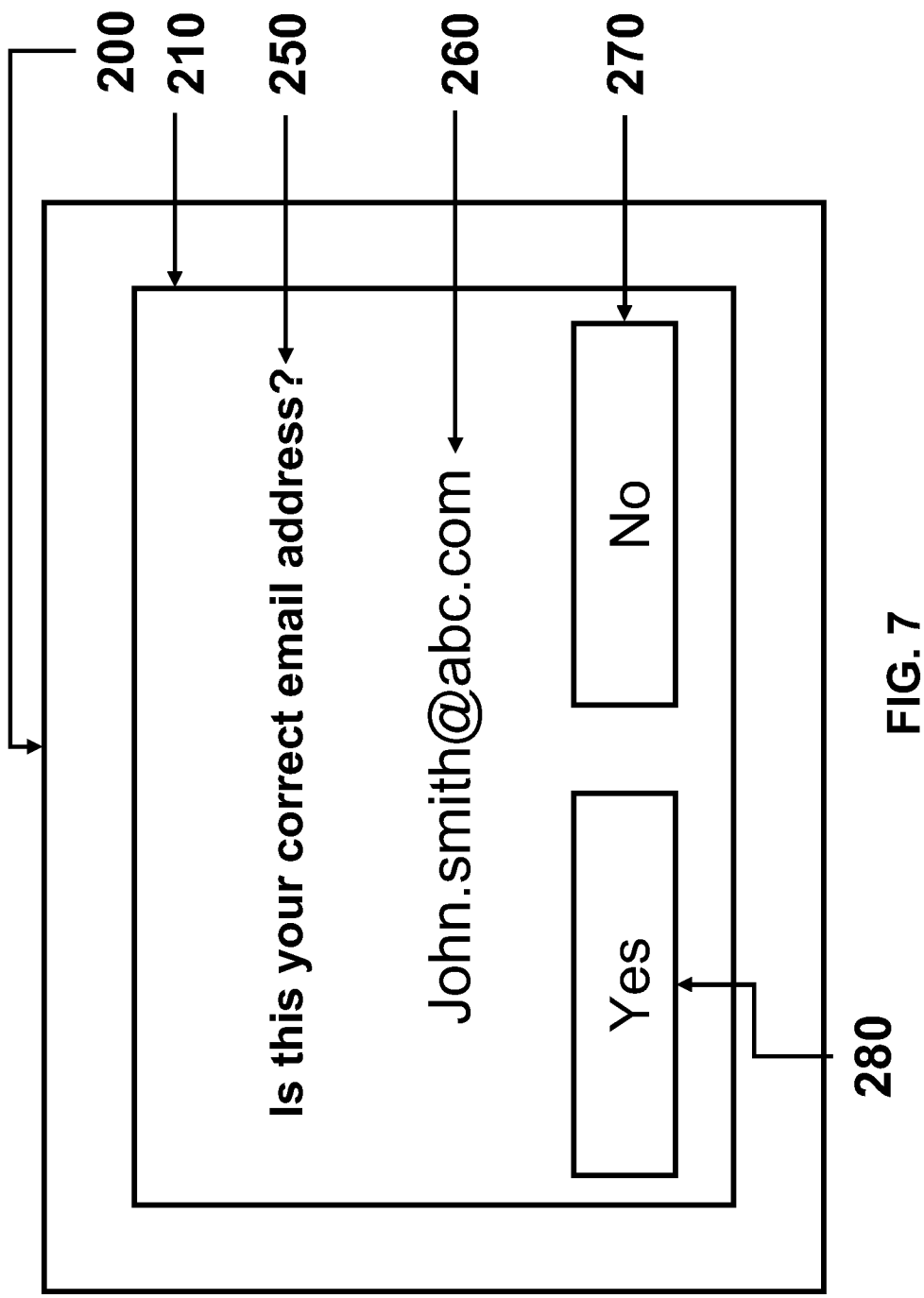
FIG. 7 is an exemplary embodiment of a display screen for users to validate customer identifying information such as a customer e-mail address.

FIG. 7 is an exemplary embodiment of a display screen for users to validate customer identifying information, such as a customer e-mail address 260. User information may also include any information from the retailer's datacenter or customer datacenter. The screen 200 may be located for example on or near the cashier's register, the POS, pole display, or any known device in the art used for displaying. The screen 200 for example may include a background 210 for displaying images, messages, and selectable buttons. For example, a message or question 250 may be presented on the background 210 for the purposes of communicating with the user. For example, the question 250 may ask the user if the correct e-mail address was pulled from the database. The display may also indicate the e-mail address 260 that was associated with for example a database, or customer's database. The display may also have selectable buttons for capturing a response to the questions 250 and messages 260 displayed to the user. For example, the buttons may allow the user to indicate "Yes" 280 or "No" 270 to the question, "Is this your correct e-mail address?."

Figure 8:
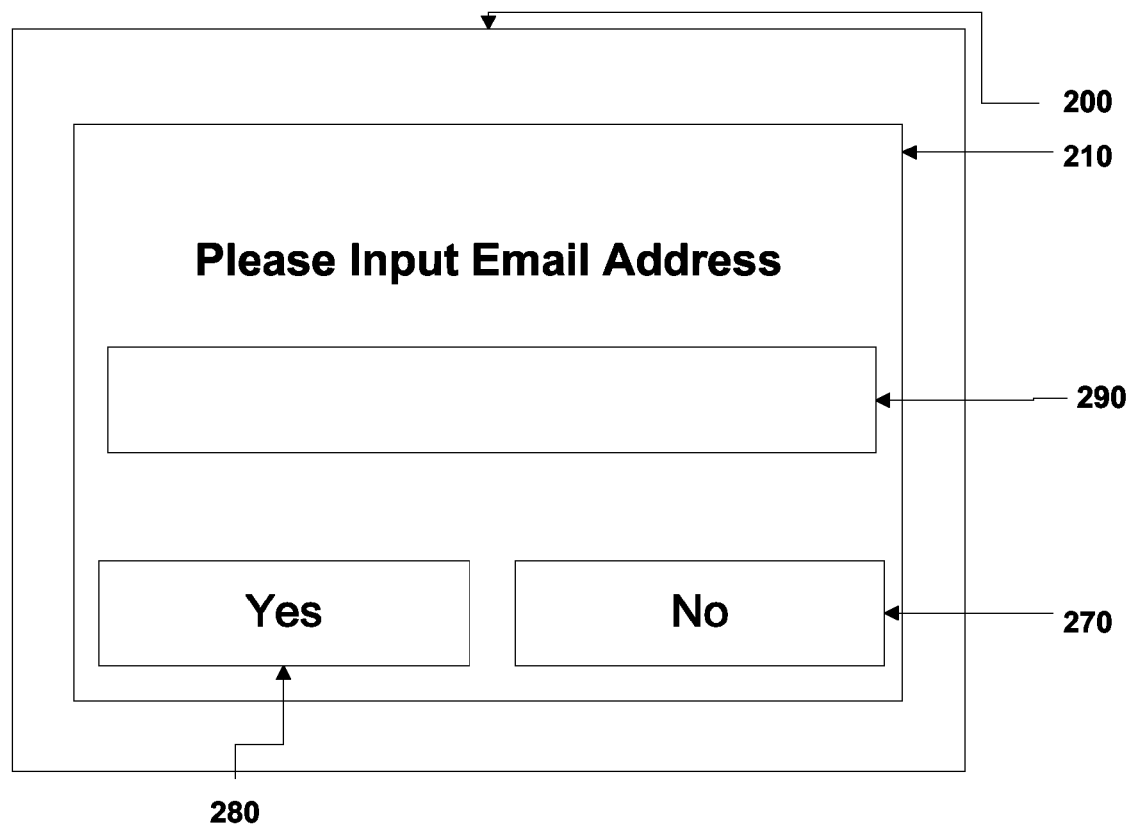
FIG. 8 is an exemplary embodiment of a display screen prompting users to input an e-mail address.

FIG. 8 is an exemplary embodiment of a display screen for prompting users to input an e-mail address. For example, if the selected or customer database does not have an e-mail address associated with the user, the user's information, or PIN, then the display screen may prompt the user to enter in or provide an e-mail address. Thus, a screen 200 may be located for example on or near the cashier's register, the POS, pole display, or any known device in the art used for displaying. The screen 200, for example, may include a background 210 for displaying images, messages, selectable buttons, and entry boxes 290. For example, if the user responds to the screen 200 question 250 in FIG. 7 with a "No" to the question "Is this your correct e-mail address?" then the screen in FIG. 8 may display the message "Please Input Email Address" and provide anyway known in the art to enter in or record the desired e-mail address. Additionally, if the database or customer's database indicates that the user does not have an e-mail address then the screen in FIG. 8 may again display the message "Please Input Email Address" and provide anyway known in the art to enter in or record the desired e-mail address. FIG. 8 presents a box 290 located on background 210 to allow the user to write in the desired e-mail address. Additionally, an on screen keyboard, keyboard, or any other means known in the art which is not shown in FIG. 8 may also be provided to capture the user's e-mail address. Display buttons "Yes" 280 and "No" 270 are provided as well. These buttons may, for example, allow the user to not enter in an e-mail address and bypass the screen or accept the e-mail address captured in for example the box 290.

Figure 9:
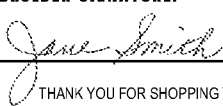
FIG. 9 is an exemplary embodiment of a receipt image.

FIG. 9 is an exemplary embodiment of a purchase order receipt image. The receipt's image is captured and e-mailed, printed, or e-mailed and printed. The same receipt that is printed at, for example, the POS may also be e-mailed to the user's device. In fact, the e-mailed receipt may have the same formatting as if it were physically printed. Thus, aside from capturing the XML data associated with the transaction, the image of the physically printed receipt is preferred to be captured. The receipt image may be captured as a jpeg, bit-map type file, or any type of file known in the art that preserves the image well enough to later read the receipt and its bar code if necessary from a display screen. Thus allowing, for example, a user to later reproduce the receipt either by way of a portable or non-portable display or print the receipt from a desired printer. A portable display may include but is not limited to a mobile phone or other similar device known in the art. A non-portable display may include but is not limited to a monitor or other similar device known in the art.

FIG. 10 is one type of a data file, such as an XML file that is captured and for example sent to the user's e-email address and or stored at a repository or database. The XML data is associated with the user's transaction, user/consumer information, and transaction habits. The XML data may be e-mailed with the receipt to the user, customer, or repository. For example, FIG. 10 illustrates the association of the customer's purchase history (store, store location, product purchased etc.) with the customer's e-mail address.

Figure 11:
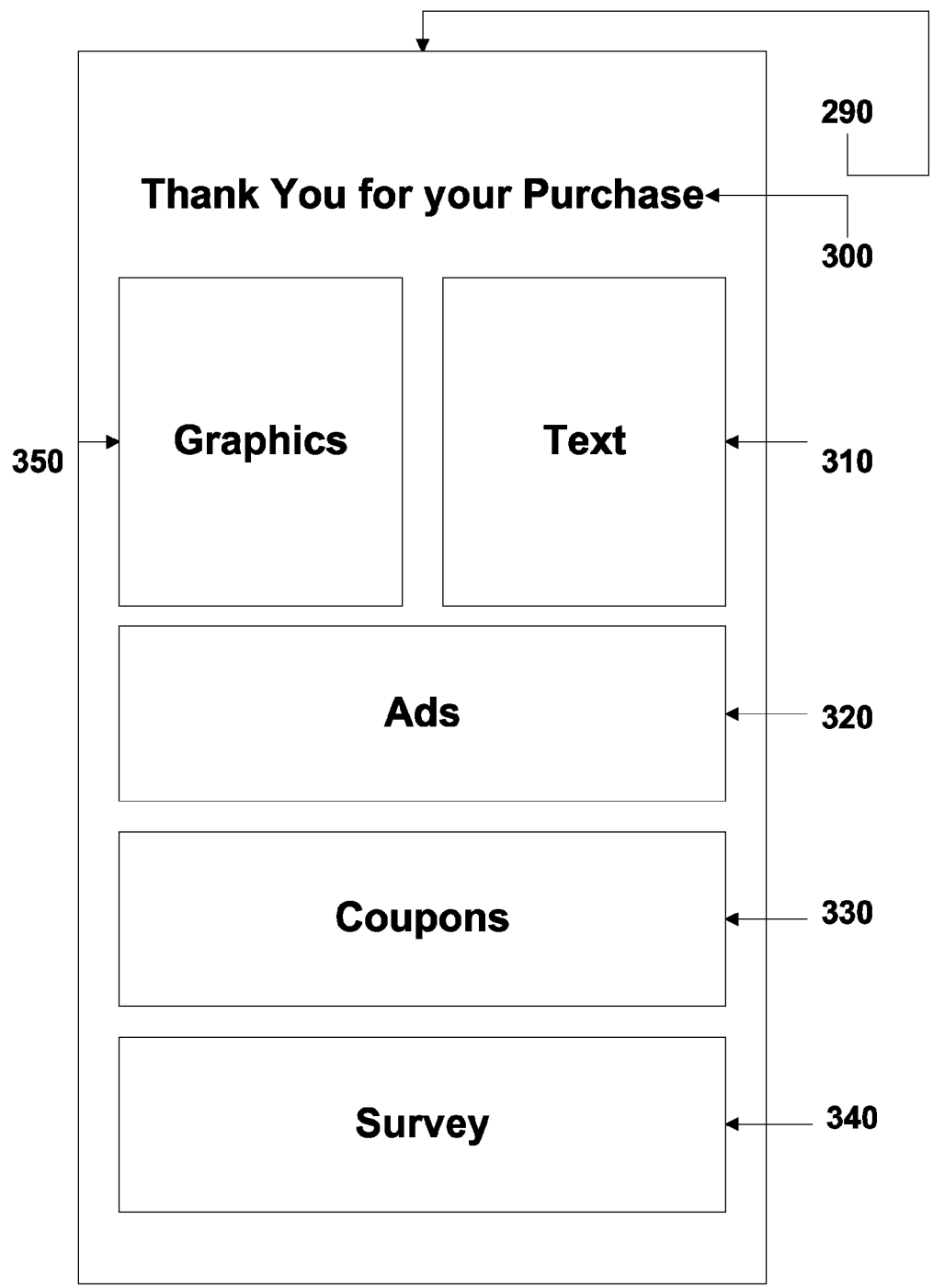
FIG. 11 is an exemplary embodiment of a template image created from a XML Image File.

FIG. 11 is one type of exemplary embodiment of the type of e-mail template 290 that may be created from a XML file. The configuration for a e-mail template 290 may be chosen based on a particular user's database file and or the user's purchase order. Thus, the e-mail template 290 may be used as a marketing template that may be sent to the user's e-mail address. The e-mail template may include text 310 thanking 300 the customer for his or her purchase. The e-mail template 290 may include graphics 350, text, or html, and the template 290 may be static or dynamic. The e-mail template may also include promotional ads 320, coupons 330, surveys 340, return information (not shown), and transaction data. The promotional ads 320, coupons 330, surveys 340, return information (not shown), and transaction data may or may not be associated with the customer's purchase history or receipt.

Figure 12:
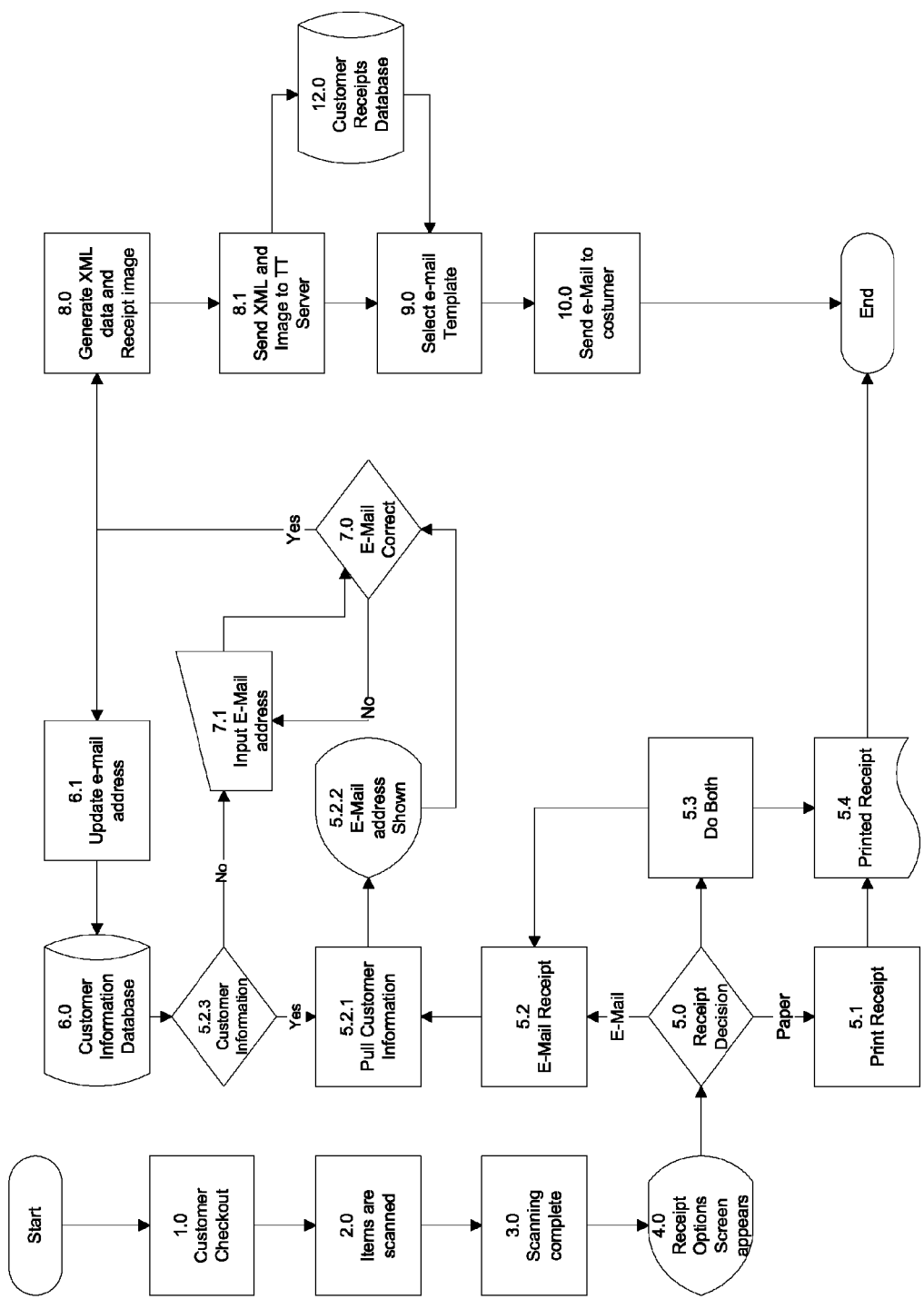
FIG. 12 is an illustration of a receipt handling method according to a sixth embodiment of the present invention.

FIG. 12 illustrates one exemplary embodiment of a process flow for providing users with the option to select the format of a receipt output, generating an XML file, and receipt image.

[1.0] Customers make purchases from retailers through different means. These devices may consist of hand-held devices, self-service kiosks, casher driven point of sale machines or other means. The customer checkout transaction may consist of products being scanned and consumers paying for product. At the completion of transaction customers are presented with a physical piece of paper that represents proof of purchase or also known as a paper receipt. The current invention may be integrated across all devices that allow for consumers or users to select how to receive their electronic receipt, paper receipt, or proof-of-purchase.

[2.0] When items are scanned it may be done by consumers or employees. Additionally, the items may be scanned at the above mentioned devices. By scanning the items consumers may be demonstrating their intent to purchase the products scanned.

[3.0] Once the scanning of the items is complete a record of the scanned items may be stored on, for example, the point of purchase's local database.

[4.0] Regardless of when payment is made, if at all, and after the scanning has completed a screen may be triggered. However, the trigger of the screen may be initiated by, for example, the selection of payment type, totaling of sale, or completion of transaction. A preselected screen may then appear on a selected device. The selected device may be a signature capture device, monitor, or pole display. The image presented on the screen may allow the user to make multiple selections. The user may then select how to receive the proof-of-purchase as a result of the transaction. Selection may be entered through touching the screen of the device or through the use of a keyboard.

[5.0] The selection of the receipt delivery format may consist of multiple options. In this embodiment there are 3 options. The user may select to e-mail, print, or perform both e-mailing and printing. Each option delivers the receipt along different processes. If the option to e-mail [5.2] is selected, the users choose to receive their receipt, for example, in electronic format only. If the option to print [5.1] is selected, then for example, the users would only like to have a printed version of their receipt. If the option to perform both [5.3] is selected, then for example, the users will receive both a printed and electronic copy of receipt.

[5.1] Receipts may be printed when the user selects print on the receipt format selection screen [4.0]. The system may then note that the transaction is to print the receipt. After the transaction is complete the receipt may be printed for the user.

[5.2] Receipts may also be generated electronically when, for example, the user selects the e-mail option on the receipt format selection screen [4.0]. The system may then note that the transaction is to be sent electronically to user. The transaction may be tied to a user by his or her e-mail address, mobile number, or identification number. The system may then search the customer database for the user's information [5.2.1].

[5.2.1] The system may search for customer information from the customer information database. The system may perform the search when an e-mail is selected [5.2] or when the both option is selected [5.3]. Customer information may be associated with one or more of the following: e-mail, phone number, identification number, or bar code. If the information is available [5.2.3], then the user information may be presented for validation [5.2.2]. If no customer information is available [5.2.3], then the user may input the information [7.1].

[5.2.2] After the user selects the option to e-mail [5.2] or the both option [5.3], information may be presented to the user for validation [5.2.2]. This information may be presented on, for example, the signature capture device, monitor, or poll display. The user may then be given two selections; yes [7.0] or no [7.0]. If the user selects the no [7.0] option, then the input correct information screen may appear [7.1]. The user may then input the correct information and confirm. The validation screen may then reappear [5.2.2] asking for validation of the information. If the user selects the yes [7.0] option, then the transaction may be marketed and information can then be captured into a XML file. After the transaction is complete, the XML file and receipt image may be generated [8.0] and sent to a server [8.1].

[5.2.3] Customer information may be pulled or extracted from a customer information database when, for example, the user selects the e-mail [5.2] option, or the both [5.3] option. The information may be stored in a database and may contain, for example: name, phone number, e-mail, bar code, or customer number. The data may be associated with a single user. The information may be captured [8.0] and input into a XML file when, for example, the user selects the e-mail [5.2] option or the both [5.3] option.

[5.3] The users may select to receive the receipt in both an electronic and print format. This selection may generate a printed receipt [5.4], XML file [8.0], and electronic image of receipt [8.0].

[5.4] After a transaction where the user has selected the print [5.1] option or the both [5.3] option, the receipt image may be printed.

[6.0] The customer information database stores may store information on users. This database may contain information, such as, but not limited to: name, e-mail, phone number, and customer number. This information may be pulled when the user selects the e-mail [5.2] option or the both [5.3] option from the receipt format screen [4.0]. This information may then be collected into the XML file [8.0].

[6.1] The user information may also be updated in the customer information database [6.0] when the user selects the no [7.0] option from the e-mail address shown [5.2.2] screen. This information may be updated after the user completes the updated process [7.1].

[7.0] The users may be presented with a validation process. This process may be associated with the validation of information presented in the e-mail address shown on screen [5.2.2]. This decision allows users to select yes or no options, related to information pulled or extracted [5.2.3] from the customer information database [6.0].

[7.1] A user may be presented with the input e-mail address screen if they select the no [7.0] option from the e-mail address shown screen [5.2.2] or if no user information is found [5.2.3] in the customer information database [6.0]. This input e-mail address screen allows users to input information. This information may then be represented in the e-mail address shown [5.2.2] screen for validation [7.0].

[8.0] The system may also generate XML data and a receipt image associated with the transaction. One exemplary embodiment of the XML data file is illustrated in FIG. 10 and one exemplary embodiment of the receipt image is illustrated in FIG. 9. The image file may be generated, for example, as a jpeg, tiff, raw, png, gif, bmp, ppm format, or any other format typically available to the art. After both files are generated the information may be transmitted to the server through TCP/IP either locally or over the internet [8.1].

[8.1] The XML data and image files may be sent through TCP/IP protocol to a server(s). This information may be sent over a local network or over the internet. The files may then be stored in a customer receipts database [12.0] located on, for example, a server.

[9.0] Additionally, an e-mail template may contain, for example, images, text, html, and links. E-mail templates may be assigned based on the XML data [8.0] stored in the customer receipts database [12.0]. These templates may be changed based on the data in the XML file that is associated with each transaction.

[10.0] Finally, the e-mail may be sent to the user's address. The e-mail may contain an associated e-mail template [9.0] and an electronic copy of the transaction.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method of processing receipts, comprising:
  obtaining transaction data from a point-of-sale (POS) computer system at a store location, the transaction data including a plurality of categories of information necessary to describe a purchasing transaction of a customer at the store location;
  obtaining image data from the POS system at a store location, the image data representing a receipt corresponding to the purchasing transaction of the customer at the store location;
  obtaining an e-mail address of the customer from a customer information database persistently associated with the POS system;
  providing, to a display device at the store location, an option to print the receipt at the store location and an option to e-mail the receipt to the customer;
  obtaining a selection of at least one of the provided options;
  if the option to print is selected, initiating printing of the image data at the store location; and
  if the option to e-mail is selected, e-mailing the receipt to the customer, including:
    providing the e-mail address obtained from the customer information database to a display device at the store location;
    obtaining customer confirmation whether the e-mail address is correct;
    if the e-mail address is not correct, obtaining a corrected e-mail address of the customer;
    transmitting the image data and the transaction data to a server in communication with one or more POS systems at one or more store locations, including generating a data file, the data file including the transaction data, the correct e-mail address of the customer and a file name corresponding to the image data;
    assigning an e-mail template based on the data file transmitted to the server; and
    sending an e-mail to the correct customer e-mail address, wherein the content of the email is based on the assigned e-mail template, where the e-mail provides the image data obtained by the server.

2. The method of claim 1, wherein the step of obtaining image data from the POS system includes generating the image data using a print driver.

3. The method of claim 1, wherein the categories of information of transaction data includes at least one of a name of the store, a location of the store, a contact information of the store, a date and time of the transaction, a description of an item purchased, and a price of an item purchased.

4. The method of claim 3, wherein the e-mail template is assigned based on the name of the store, based on the location of the store, based on the contact information of the store, based on the date and time of the transaction, based on the item purchased or based on a price of the item.

5. The method of claim 4, wherein the e-mail template includes a customized graphic, a customized advertisement, a customized coupon or a customized survey based on the e-mail template assigned.

6. The method of claim 1, wherein the steps of obtaining transaction data from the POS system at the store location, obtaining image data from the POS system and obtaining the e-mail address of the customer from the customer information database associated with the POS system occur after the option to e-mail is selected.

7. The method of claim 1, wherein image data is included as an attachment in the e-mail sent to the customer.

8. The method of claim 1, wherein the image data is stored separately from the e-mail to the customer.

9. The method of claim 8, wherein the e-mail includes a link directing the customer to the stored image data.

10. The method of claim 1, wherein the step of transmitting the image data and the transaction data to the server in communication with one or more POS systems includes transmitting the image data and the transaction data via the Internet to the server.

11. The method of claim 1, wherein the POS system includes: a plurality of POS subsystems for handling purchasing transactions of a plurality of customers; and a central data system in communication with the plurality of POS subsystems for storing the processing information of the purchasing transactions of the plurality of customers.

12. The method of claim 1, wherein obtaining a selection of at least one of the provided options includes obtaining a selection to print and email.

13. The method of claim 1, further comprising generating XML data and transmitting the XML data to the server, wherein the XML data includes the transaction data, the correct e-mail address of the customer and a file name corresponding to the image data.

\* \* \* \* \*